(12) United States Patent
Darling et al.

(10) Patent No.: US 9,755,255 B2
(45) Date of Patent: Sep. 5, 2017

(54) APPARATUS AND METHOD FOR FUEL CELL START FROM FREEZING WITHOUT MELTING ICE

(71) Applicant: Audi AG, Ingolstadt (DE)

(72) Inventors: Robert M. Darling, South Windsor, CT (US); Timothy W. Patterson, Jr., West Hartford, CT (US); Michael L. Perry, Glastonbury, CT (US); Jonathan O'Neil, Bolton, CT (US)

(73) Assignee: Audi AG, Ingolstadt (DE)

( * ) Notice: Subject to any disclaimer, the term of this patent is extended or adjusted under 35 U.S.C. 154(b) by 231 days.

(21) Appl. No.: 14/512,288

(22) Filed: Oct. 10, 2014

(65) Prior Publication Data

US 2015/0030946 A1    Jan. 29, 2015

Related U.S. Application Data

(62) Division of application No. 13/138,021, filed as application No. PCT/US2009/000514 on Jan. 26, 2009, now abandoned.

(51) Int. Cl.
*H01M 8/04* (2016.01)
*H01M 8/04303* (2016.01)
*H01M 8/04119* (2016.01)
*H01M 8/04223* (2016.01)

(52) U.S. Cl.
CPC ... *H01M 8/04303* (2016.02); *H01M 8/04156* (2013.01); *H01M 8/04179* (2013.01); *H01M 8/04253* (2013.01); *H01M 2250/20* (2013.01); *Y02T 90/32* (2013.01)

(58) Field of Classification Search
None
See application file for complete search history.

(56) References Cited

U.S. PATENT DOCUMENTS

| 3,479,224 A | 11/1969 | Jäger |
| 5,200,278 A | 4/1993 | Watkins et al. |
| 6,242,119 B1 | 6/2001 | Komura et al. |

(Continued)

FOREIGN PATENT DOCUMENTS

| JP | 2000-208158 A | 7/2000 |
| JP | 2007-026893 | * 2/2007 ............. H01M 8/04 |

(Continued)

OTHER PUBLICATIONS

International Search Report on Patentability mailed Oct. 26, 2009 for International application No. PCT/US2009/000514.

*Primary Examiner* — Ula C Ruddock
*Assistant Examiner* — Tony Chuo
(74) *Attorney, Agent, or Firm* — Seed IP Law Group LLP

(57) ABSTRACT

Fuel cell systems and related methods involving accumulators with multiple regions of differing water fill rates are provided. At least one accumulator region with a relatively more-rapid fill rate than another accumulator region is drained of water at shutdown under freezing conditions to allow at least that region to be free of water and ice. That region is then available to receive water from and supply water to, a fuel cell nominally upon start-up. The region having the relatively more-rapid fill rate may typically be of relatively lesser volume, and may be positioned either relatively below or relatively above the other region(s).

18 Claims, 3 Drawing Sheets

(56) References Cited

U.S. PATENT DOCUMENTS

| | | |
|---|---|---|
| 6,537,692 B1 | 3/2003 | Horiguchi et al. |
| 2002/0094467 A1 | 7/2002 | Nonobe et al. |
| 2009/0291337 A1 | 11/2009 | Tamura et al. |
| 2010/0021778 A1 | 1/2010 | Steinshnider et al. |
| 2011/0281186 A1 | 11/2011 | Darling et al. |

FOREIGN PATENT DOCUMENTS

| | | |
|---|---|---|
| JP | 2007-087718 A | 4/2007 |
| JP | 2004-288486 A | 10/2014 |
| WO | 2006/112833 A1 | 10/2006 |

\* cited by examiner

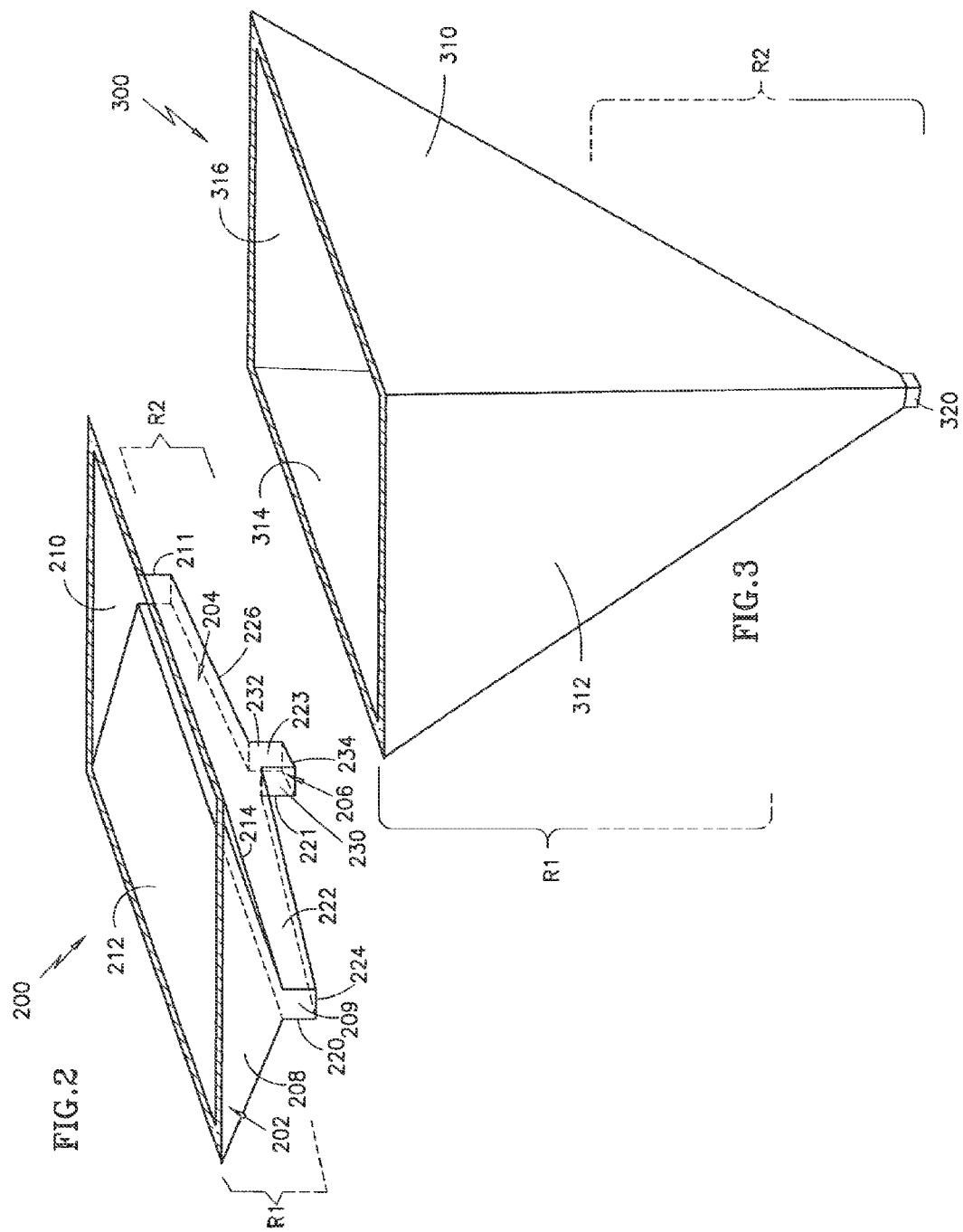

APPARATUS AND METHOD FOR FUEL CELL START FROM FREEZING WITHOUT MELTING ICE

BACKGROUND

Technical Field

The disclosure relates generally to fuel cells, and more particularly to fuel cell systems, accumulators therefor, and related methods. More particularly still, the disclosure relates to such fuel cell systems and accumulators for operation in sub-freezing temperatures.

Description of the Related Art

Fuel cell systems, such as fuel cell power plants that provide power to the propulsion system of electric vehicles, must be operable at temperatures below that at which water will freeze. Fuel cell systems using proton exchange membranes (PEM) are most typically utilized in such applications, and require a well-hydrated membrane for good operation and durability. During normal operation, water may be drawn through a PEM fuel cell from the anode to the cathode. Notably, water is also produced at the cathode. Traditional methods of operating fuel cells that are shut down in environments which may reach freezing temperatures involve draining some or all of the water out of the fuel cell into a reservoir of some sort, as for example an accumulator. Before trying to establish subsequent operation, frozen water must be melted before it can be moved back into the fuel cell, which process may take at least several minutes, resulting in a delay that is likely to be viewed as intolerable for such transportation usage, where delays preferably do not exceed a few seconds. Moreover, the melting of the frozen water typically requires the application of a source of energy that may adversely impact the efficiency of the system.

One approach to deal with a facet of these concerns is described in PCT International Published Application WO 2006/112833 A1, wherein the cells include porous water transport plates, and water contained only in the water channels, ducts or pores of cells during operation is retained there by capillary action and/or by vacuum during shutdown, and serves to provide some humidification and cooling at start-up. While this may at least partly address some problems, it relies upon the fuel cells having either coolant ducts of small size for the capillary action or the use of a vacuum, or both, to prevent water from "slumping" into the reactant channels of the fuel cells. Additionally, it allows some amount of freezing of the water within the cells themselves during shutdown, so long as it is limited to the coolant ducts and not the reactant channels. While this may be tolerable, it is less than desirable because it increases the time needed to bring the cell to operating temperature. Moreover, it does not really address the need to relatively rapidly and efficiently provide water from a reservoir, such as an accumulator, to the fuel cells at, or shortly after, start-up, under freezing conditions.

BRIEF SUMMARY

It has been determined that a fuel cell system with porous water transport plates can be started, particularly though not exclusively, under freezing conditions, if a small amount of water can be made available to the fuel cells from the accumulator relatively soon after starting. This is particularly true for evaporatively cooled systems that are less dependent on large volumes of water flow and can, therefore, be operated with less water stored in the system. In that regard, the presently disclosed system(s) provide an accumulator structured to assure that at least a minimum usable quantity of water is available for supply to the fuel cells quickly, in an acceptable interval, after start-up occurs, even under freezing conditions. This is accomplished without resort to supplemental thawing means, even though some frozen water may exist in part of the accumulator.

A fuel cell system subject to operation under freezing conditions is disclosed in which there is at least one fuel cell, and an accumulator operative to receive water from and supply water to, the at least one fuel cell. The water from the fuel cell may go directly to the fuel cell, or may be delivered indirectly, as via a condenser or the like. The accumulator has structure defining a first region having a first volume configured to contain a volume of water during steady state operation of the at least one fuel cell and configured to fill with water vertically at a first rate for an arbitrary fill water flow rate, and structure defining a second region having a second volume and configured to fill with water vertically at a second rate greater than said first rate for said same arbitrary fill water flow rate. The accumulator also includes a drain in the second region, said drain being configured and operative to allow water to drain substantially entirely from at least said second region following shutdown of the at least one fuel cell, thereby to prevent water from freezing in at least said second region. The volume of the first region is typically, though not necessarily, greater than the volume of the second region.

In one example embodiment, the accumulator second region is positioned lower than the accumulator first region and includes a geometry, relative to the geometry of the first region, that fills with water vertically more rapidly than does the first region at the same fill water flow rate. This may be accomplished by the walls or sides of at least the accumulator second region being arranged to define a cross-sectional area that is generally less than the cross sectional area defined by the walls or sides of the accumulator first region. For example, the accumulator first region may be defined by near-vertical or slightly inwardly inclined walls, and the walls of the accumulator second region may extend downward there from in and range from near vertical to inward inclination at a relatively greater angle than for the first region. Alternatively, the walls of both the accumulator first and second regions may have a common inwardly inclined contour, as for example an inverted cone, with the accumulator second region being lower than the accumulator first region.

In another example embodiment, the accumulator second region may be positioned or located somewhat in, and/or relatively above, the accumulator first region, and includes a drain which allows water to drain, preferably passively, into the larger accumulator first region. This enables the accumulator second region to drain out all of its water into the accumulator first region upon shut-down, thus insuring that the second region is dry and does not freeze. The level of water accumulated in the first region is regulated to remain below the second region to assure the ability of the first region to drain. The drain may be some sort of restriction, as an orifice or porous plug. Return lines from both of the accumulator first and second regions assure that one or both regions may serve as sources of water for the fuel cells. The water in the accumulator first region may be allowed to freeze upon shutdown, since the accumulator second region goes dry and is available to receive water quickly upon start-up. This embodiment limits or eliminates the need to dump water from the accumulator to prevent freeze-up.

In operation, upon shutdown of the fuel cells during freezing conditions, water is actively or passively drained from at least the accumulator second region to leave it dry for rapid refilling with water upon start-up (re-start) of the fuel cells. The active draining involves the opening and closing of a drain valve. Assuming the restart also occurs during cold conditions, fans associated with a condenser are set to high speed to maximize the water returned to the accumulator first region. The fuel cells can run sufficiently long under this cold condition for water to be produced and collected in the accumulator second region and then returned to the fuel cells.

BRIEF DESCRIPTION OF THE SEVERAL VIEWS OF THE DRAWINGS

FIG. 2 is a schematic diagram depicting an exemplary embodiment of an accumulator in accordance with FIG. 1;

FIG. 3 is a schematic diagram depicting a further exemplary embodiment of an accumulator in accordance with FIG. 1.

DETAILED DESCRIPTION

Fuel cell systems and related methods involving accumulators with regions of relatively low volume and/or relatively high vertical fill rate are provided, several exemplary embodiments of which will be described in detail. In this regard, in some embodiments, sloped sidewalls of the accumulators are used. As such, the sloped sidewalls encourage efficient draining of the accumulators. Additionally, the low volume and/or high fill rate regions require relatively less water to fill to a vertical height necessary for providing the water from the accumulator. This potentially enables water filling the low volume and/or high fill rate region to be directed for use in other portions of a fuel cell system more quickly.

Figure 1:
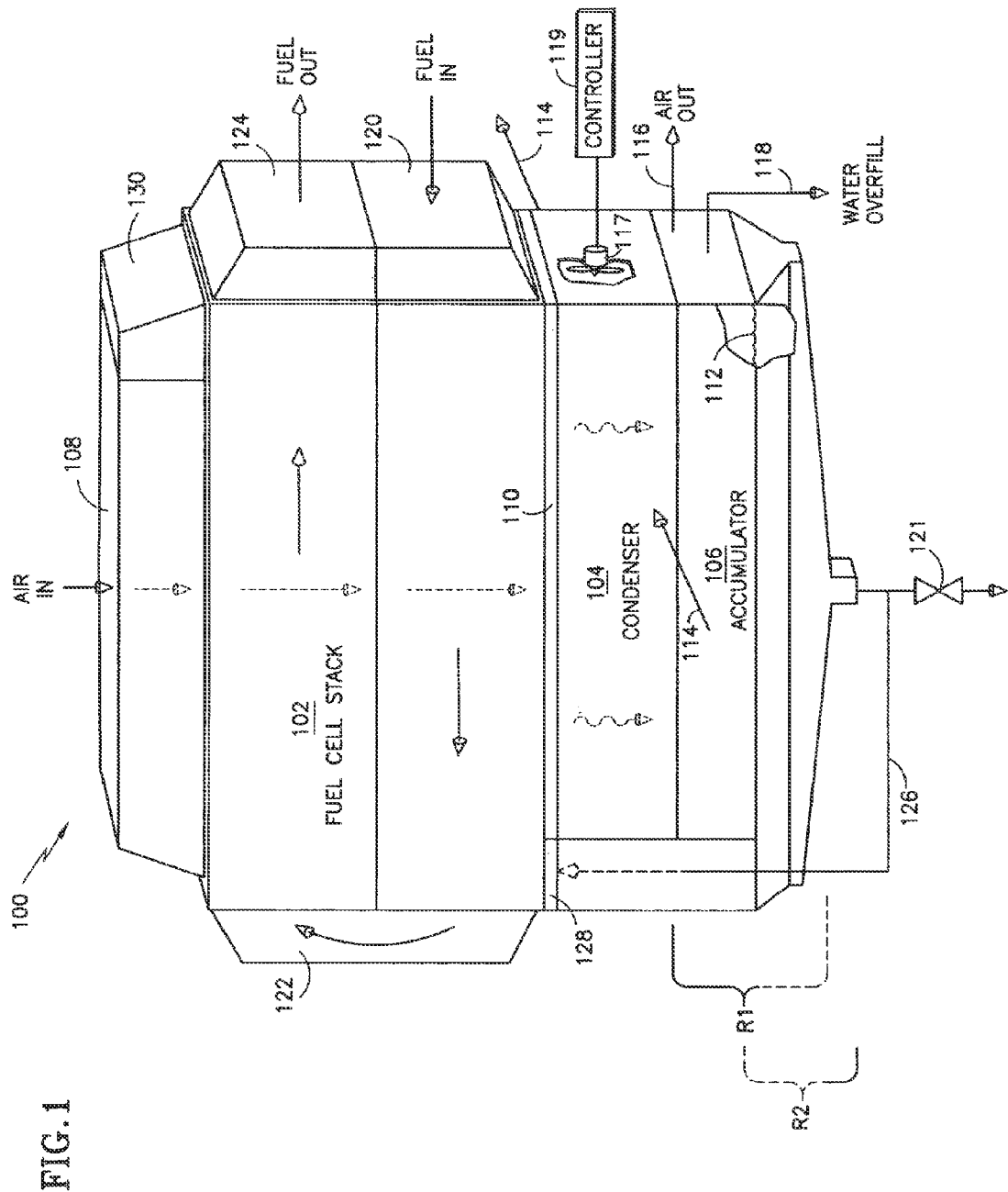
FIG. 1 is a schematic diagram depicting an exemplary embodiment of a fuel cell system.

FIG. 1 is a schematic diagram depicting an exemplary embodiment of a fuel cell system. As shown in FIG. 1, system 100 includes a fuel cell stack 102, sometimes called a cell stack assembly. Fuel cell stack 102 includes multiple fuel cells, typically of the Proton Exchange Membrane (PEM) type. The fuel cell stack is positioned above a condenser 104, which is positioned over a water accumulator 106. An air inlet manifold 108 is located above the fuel cell stack and an air outlet manifold 110 is positioned below the stack. A fuel inlet manifold 120, a fuel turn manifold 122 and a fuel outlet manifold 124 also are provided.

In operation, air enters air inlet manifold 108, flows through the oxidant flow channels of the fuel cell stack 102 to air outlet manifold 110, and then into condenser 104. The outflow from condenser 104 is above water line 112 of accumulator 106. Coolant for the condenser (illustrated by arrows 114) is ambient air in this embodiment. One or more variable-speed fans 117 are associated with the condenser and are controlled by controller 119 to facilitate the rate at which moisture is condensed from the air exiting the fuel cell stack. Cool dry air from the condenser is expelled from air outlet 116, which is located adjacent to a water overfill 118. In some embodiments, the condenser may function as a manifold, in which case air outlet manifold 110 may be omitted.

During operation, fuel provided to fuel inlet manifold 120 flows to the left, then through fuel turn manifold 122, after which the fuel flows to the right. The fuel then flows out through fuel outlet manifold 124. Also, during operation, return water from the accumulator 106 flows through a water conduit 126 to a water manifold 128. The water then passes into water channels within and/or adjacent to, the various fuel cells of the fuel cell stack 102 to the top of the fuel cell stack and possibly to an upper water manifold 130. Notably, the embodiment of FIG. 1 employs evaporative cooling. Thus, the only water entering through the water manifold is to replace that which is evaporated into the air channels of the fuel cell stack. A drain/drain valve 121 is located in the bottom of the accumulator 106, or near thereto in the return water conduit 126, and may be controlled by controller 119 to drain water from the system, as will be discussed further following.

The accumulator 106, in accordance with the present disclosure, includes at least structure defining a first region having a first volume configured to contain a volume of water during steady state operation of the at least one fuel cell and configured to fill with water vertically at a first rate for an arbitrary fill water flow rate, and structure defining a second region having a second volume and configured to fill with water vertically at a second rate greater than said first rate for said same arbitrary fill water flow rate. The volume of the accumulator second region will typically be much smaller than that of the accumulator first region, but need not be so if the water vertical fill rate relationship expressed above is otherwise met. The accumulator first region will be hereinafter designated R1, or a derivative thereof, and the accumulator second region is designated R2, or a derivative thereof. It will be noted with reference to the embodiments of FIGS. 1-3 that there may not be a clear demarcation of the transition from region R1 to region R2, and thus they are depicted as overlapping. Indeed, with respect to the detailed description of the accumulator embodiment of FIG. 2, it is presented as having three regions, an "upper", a "lower", and an "intermediate", but it should be understood that the intermediate region could be viewed as all R1, all R2, or partly R1 and partly R2, so long as the guiding requirements expressed above are met.

FIG. 2 is a schematic diagram depicting an exemplary embodiment of an accumulator similar to that depicted in FIG. 1. As shown in FIG. 2, accumulator 200 includes an upper region 202, an intermediate region 204 and a lower region 206, which collectively comprise regions R1 and R2. Specifically, upper region 202 incorporates opposing endwalls 208, 210, and sloped sidewalls 212, 214 extending between the endwalls. Notably, lower portions (209, 211) of the endwalls define ends of the intermediate region. In the embodiment of FIG. 2, the sidewalls are inwardly inclined downwardly toward the intermediate region.

Intermediate region 204 is generally configured as a channel that runs along the major central axis of the accumulator. The intermediate region includes opposing sidewalls 220, 222, and downwardly inclined bottom walls 224, 226, which extend toward the lower region 206. Notably, lower portions (221, 223) of the sidewalls 220, 222 function as sidewalls for the lower region 206.

In this regard, the lower region 206 is defined by opposing sidewalls (lower portions of sidewalls 220, 222), endwalls 230, 232 that extend between the sidewalls, and a bottom, or drain, 234, for connection with a drain valve and return line, such as elements 121 and 126 of FIG. 1. The lower region defines a volume that is relatively small in comparison to the overall volume of the accumulator. As noted previously, region R2 may consist only of lower region 206, or it may additionally include part of intermediate region 204.

FIG. 3 is a schematic diagram depicting an accumulator 300 that is functionally identical to that of FIG. 2, but which depicts the range of latitude in selecting the structural configuration for the regions R1 and R2. More specifically, whereas the accumulator 200 of FIG. 2 may have a relatively compact vertical profile, it requires a number of planar facets to construct, the inverted pyramidal accumulator 300 is of deeper vertical profile but relies on fewer and simpler members or facets to construct. Indeed, the accumulator may be as simple in shape, though not necessarily simple to construct, as an inverted cone. Referring to FIG. 3, the accumulator 300 is formed principally of 4 joined inverted triangular sides 310, 312, 314, and 316, and having a small bottom, or drain, 320 at or near its apex, for connection with a drain valve and return line, such as elements 121 and 126 of FIG. 1.

Figure 4:
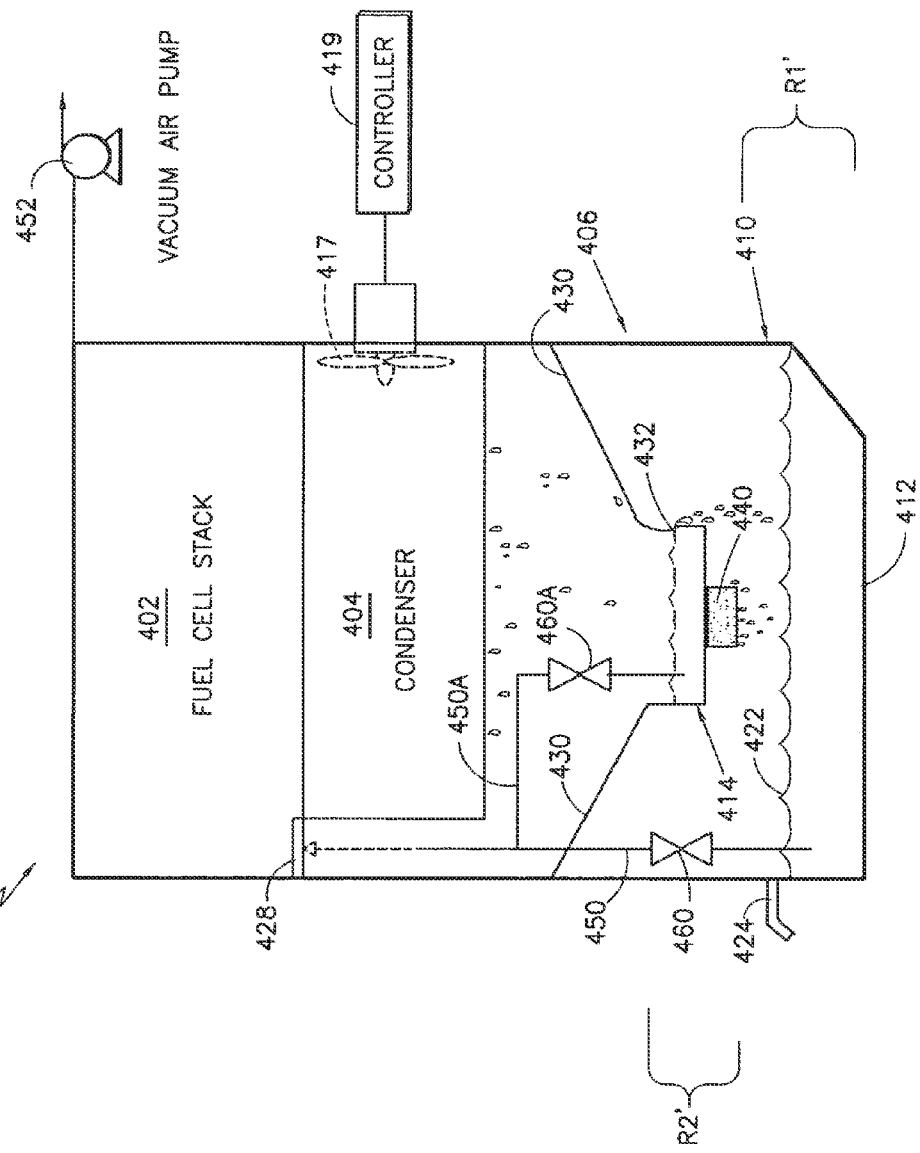
FIG. 4 is a schematic diagram depicting a further exemplary embodiment of a fuel cell system, including accumulator.

FIG. 4 is a schematic diagram of a fuel cell system 400 generally analogous to FIG. 1, but in which the structure and function of the accumulator 406 differ somewhat from that depicted and described with respect to the FIGS. 1-3 embodiments. More particularly, the fuel cell stack 402, the condenser 404, and condenser fans 417 may be identical to those discussed with respect to FIG. 1, and will not be described further. On the other hand, the accumulator 406 positioned below the underside of condenser 404 is structured to comprise a relatively large container or chamber 410 having a bottom 412 for storage of the majority of water provided by the condenser 404, and a further, typically smaller, container or chamber 414 supported or mounted within container 410 and spaced above the bottom of container 410. The relatively large container 410 may typically have a water level shown as 422 and established and controlled in a known manner which may include an overflow vent 424 for establishing a maximum water level 422 and venting any excess water. The smaller container 414 is positioned entirely above the level of that maximum water level established by the overflow vent 424.

The smaller container 414 may be cup-like or bowl-like in shape and supported from, or by, the relatively larger container 410, by inclined support baffle 430 connected to each container. The support baffle 430 is conveniently a substantially continuous annular surface for intercepting the majority of the water discharged from condenser 404 and directing it into the smaller container 414. Importantly, the general cross-sectional area of the smaller container 414 is less, or considerably less, than that of the relatively larger container measured at and below the typical water level 422, such that the former will have a relatively greater vertical fill rate than the latter for a given flow of water. To achieve this result in view of the large cross-sectional area of the support baffle, the smaller container 414 includes some form of overflow vent 432 positioned to limit the effective height of that container and thus assure the desired smaller cross-sectional area, and to additionally provide for rapid overflow of water to the larger container 410 if necessary. Notably, the smaller container 414 includes at its bottom a passive form of drain 440, which comprises a restriction such as an orifice, a porous plug as shown, or the like.

As with the embodiments of FIGS. 1-3, the accumulator 406 of the FIG. 4 embodiment includes a first region R1' and a second region R2' having the same functional relationships of vertical fill rates and possibly also volume as stated earlier, and it will be understood that it is the relatively larger container 410 that now constitutes the "first region" R1' (below overflow vent 424) and the smaller container 414 constitutes the "second region" R2' (below overflow vent 432). This is so, despite container 414 being positioned above portions of container 410.

A water conduit 450 extends from near the bottom of relatively larger container 410 to the water manifold 428 of the fuel cell stack 402 to return water to the fuel cell stack. A further water conduit 450A extends from near the bottom of the smaller container 414 also to water manifold 428, as by connection with conduit 450, to deliver/return water to the fuel cell stack. A vacuum air pump 452 connected to the fuel cell stack 402 provides the delivery/return of water to the stack from either container 410 or 414 via the conduits 450, 450A, and may be controlled by a controller 419 which also controls the condenser fan(s) 417. These conduits 450, 450A also allow water to drain from the stack to the accumulator 406 on shutdown. Optional valves 460 and/or 460A may be placed in conduits 450 and/or 450A, respectively, to avoid excess gas ingestion.

Very general reference is made first to aspects of operation common to all of the disclosed embodiments, and then separately to the distinctive aspects of operation for the FIGS. 1-3 embodiments, and then further to the distinctive aspects of the FIG. 4 embodiment. Referring to FIGS. 1-4, at the time of shutdown of the fuel cell stack under freezing (including sub-freezing) conditions, there will typically be accumulated condensed water in accumulator regions R1 (or R1') and R2 (or R2'). The water in at least region R2/R2' is either actively or passively drained to create an ice-free region of the accumulator, and is positioned and structured to receive new water from the condenser relatively soon after the next start-up of the fuel cell stack. At start-up, the controller 119, 419 causes the condenser fans 117, 417 to operate at high speed to maximize water returned to the accumulator. Particularly in freezing conditions, the stack can operate safely at reduced temperature for the short interval until sufficient water is produced. Even when ambient temperatures are relatively warm, the stack can be started and operate effectively, premised on relatively rapid refilling of the accumulator with water. At least region R2/R2' is structured such that it can relatively rapidly accumulate most or all of the new water, and it has associated with it a return conduit 126, 450A for conveying that water back to the fuel cell stack to cool it.

Referring specifically to the FIGS. 1-3 embodiments, the drain valve 121 connected to the bottom of region R2 of the accumulator is opened at shutdown, and serves to gravity-purge the entire accumulator (regions R1 and R2) of water such that no ice is formed in the accumulator. The valve 121 is then closed. Upon subsequent start-up, water from the stack 102 and condenser 104 is delivered to the accumulator 106, 200, 300 whereupon it rapidly begins to fill region R2 for supplying the stack via return water conduit 126. Because there was no water in the accumulator, there is no ice that must be melted before start-up from freezing conditions.

Referring specifically to the FIG. 4 embodiment, most or substantially all of the water produced from condenser 404 falls to the downwardly and inwardly inclined support baffle 430 and is collected in the smaller container 414 comprising region R2'. That water rapidly fills the container 414 and most simply overflows via the overflow vent 432 and falls to the relatively larger container 410 where it accumulates as main water level 422. Concurrently, a limited amount of the water collected in smaller container 414 also slowly drains via the passive drain 440 to the larger container 410 below. This slow drainage via drain 440 is of little consequence during normal steady-state operation, but is important at both a frozen shut-down and upon a subsequent frozen start-up. More specifically, upon a frozen shut-down, the water collected in smaller container 414 slowly drains out of the container, to leave it dry and ice-free. While the water accumulated below in the relatively larger container 410 comprising region R1' is allowed to freeze if such conditions exist, this does not prevent a subsequent effective start-up under those conditions. Rather, at start-up, newly condensed water from stack 402 and condenser 404 soon fills the slow-draining smaller container 414, and water is thus available for return to the stack via water conduit 450A.

The optional valve 460, which may be located on the water return conduit 450 from larger container 410 prior to its junction with the conduit 450A from smaller container 414, serves when closed to prevent excess gas ingestion from container 410 while thawing is occurring there. That valve should be located away from any ice that could form. Another optional valve 460A can be located on the water return conduit 450A from the smaller container 414 to prevent, when closed, gas ingestion from that container, which might otherwise occur in that short interval just after start-up when there is still relatively little or no water in the smaller container 414. Control of each of these valves 460, 460A may be provided by the controller 419. Similarly, control of the vacuum air pump 452 may be provided by the controller 419.

While certain aspects of the structure and function of the FIG. 4 embodiment may be more complex than those of the FIGS. 1-3 embodiments, other aspects are less complex. Moreover, because the FIG. 4 embodiment offers the ability to retain the water within the accumulator 406 during a frozen shutdown, it minimizes or eliminates the need to discharge liquid water overboard and may provide relatively more water more quickly in the event of a non-frozen/warm start-up, whether the prior shut-down was frozen or not.

Although the disclosure has been described and illustrated with respect to the exemplary embodiments thereof, it should be understood by those skilled in the art that the foregoing and various other changes, omissions and additions may be made without departing from the spirit and scope of the disclosure. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a fuel cell system at shutdown under freezing conditions, the fuel cell system having a fuel cell stack, and an accumulator for receiving water from and supplying water to the fuel cell stack, the accumulator having structure defining a first region having a first volume configured to contain a volume of water during steady state operation of the fuel cell stack and configured to fill with water vertically at a first rate for an arbitrary fill water flow rate, and structure defining a second region having a second volume and configured to fill with water vertically at a second rate greater than said first rate for said same arbitrary fill water flow rate, said first volume of said first region being greater than said second volume of said second region, the method comprising:
draining water from the second region of the accumulator at shutdown to allow the second region to be substantially water and ice-free during shutdown, whereby said second region of the accumulator may receive water from and supply water to the fuel cell stack upon start up.

2. The method of claim 1 wherein said second region is positioned relatively above the first region, and wherein draining the second region is continuous via a passive drain discharging into at least the first region.

3. The method of claim 1, wherein draining water from the second region of the accumulator at shutdown includes draining water through a drain provided in the second region.

4. The method of claim 3 wherein the second region of the accumulator is positioned below the first region of the accumulator, wherein the first region of the accumulator and the second region of the accumulator each have respective vertical extents and have sidewalls that define a respective cross-sectional area along the respective vertical extents, and wherein the cross-sectional area of the second region of the accumulator is less than the cross-sectional area of the first region of the accumulator.

5. The method of claim 4 wherein the sidewalls defining at least one of the first and second regions of the accumulator are inclined downwardly inward.

6. The method of claim 3 wherein the drain in the second region of the accumulator includes a valve that is operative to permit selective drainage of the accumulator.

7. The method of claim 6 wherein the valve of the drain is automatically controlled by a controller.

8. The method of claim 3 wherein a water conduit is operatively connected from at least the second region of the accumulator to the fuel cell stack to return water to the fuel cell stack.

9. The method of claim 1, further comprising:
providing a condenser and a variable speed condenser fan, the condenser fan being operative at a maximum fan speed responsive to a start-up condition of the at least one fuel cell.

10. The method of claim 1 wherein the fuel cell stack comprises a stack of multiple Proton Exchange Membrane fuel cells.

11. The method of claim 3 wherein the second region of the accumulator is positioned above the first region of the accumulator, wherein the first region of the accumulator and the second region of the accumulator each have respective vertical extents and sidewalls that define a respective cross-sectional area along the respective vertical extents, and wherein the cross-sectional area of the second region of the accumulator is less than the cross-sectional area of the first region of the accumulator.

12. The method of claim 11, further comprising:
directing water from the fuel cell stack to the accumulator such that most of the water from the fuel cell stack is directed to the second region of the accumulator prior to the first region of the accumulator.

13. The method of claim 12 wherein the drain in the second region of the accumulator comprises a passive device that allows a continuous restricted flow there through to the first region of the accumulator.

14. The method of claim 13 wherein the passive device comprises a porous plug.

15. The method of claim 13 wherein a structure of the second region of the accumulator includes an overflow arrangement configured to discharge water from the second region of the accumulator to the first region of the accumulator at a rate greater than the continuous restricted flow via said passive device when water in the second region of the accumulator exceeds a predetermined level.

16. The method of claim 11 wherein water conduits extend from each of the first and second regions of the accumulator, and are each operative to return water to the fuel cell stack.

17. A method of operating a fuel cell system at shutdown under freezing conditions, the method comprising:
providing a fuel cell stack and an accumulator for receiving water from and supplying water to the fuel cell stack, the accumulator having structure defining a first region having a first volume configured to contain a volume of water during steady state operation of the fuel cell stack and configured to fill with water vertically at a first rate for an arbitrary fill water flow rate, and structure defining a second region having a second volume and configured to fill with water vertically at a second rate greater than said first rate for said same arbitrary fill water flow rate, said first volume of said first region being greater than said second volume of said second region, and the accumulator including a drain in the second region; and
draining water from at least the second region of the accumulator at shutdown to allow the second region to be substantially water and ice-free upon shutdown, whereby said second region of the accumulator may receive water from and supply water to the fuel cell stack upon start up.

18. A method of operating a fuel cell system having a fuel cell stack and an accumulator for receiving water from and supplying water to the fuel cell stack, the accumulator having structure defining a first region having a first volume configured to contain a volume of water during steady state operation of the fuel cell stack and configured to fill with water vertically at a first rate for an arbitrary fill water flow rate, and structure defining a second region having a second volume and configured to fill with water vertically at a second rate greater than said first rate for said same arbitrary fill water flow rate, said first volume of said first region being greater than said second volume of said second region, the method comprising:
shutting down the fuel cell system under freezing conditions;
draining water from at least the second region of the accumulator at shutdown to allow the second region to be substantially water and ice-free upon shutdown; and
supplying water from the fuel cell stack to the second region of the accumulator and withdrawing water from the second region of the accumulator for supply to the fuel cell stack upon start up.

* * * * *